Patented Dec. 4, 1923.

1,476,204

UNITED STATES PATENT OFFICE.

EDWIN G. JAMES, OF CHICAGO, ILLINOIS.

METHOD OF SHRINKING ANIMAL CASINGS.

No Drawing. Application filed March 26, 1923. Serial No. 627,918.

*To all whom it may concern:*

Be it known that I, EDWIN G. JAMES, a citizen of the United States, residing at Chicago, in the county of Cook and State of Illinois, have invented a certain new and useful Improvement in Methods of Shrinking Animal Casings, of which the following is a specification.

The usual preparation of sausage in so-called "Frankfurt style," "Vienna style," and other kinds consumes most of the available world supply of the larger diameter sheep casings, ranging in diameter, say, from $\frac{5}{8}''$ to $1\frac{1}{4}''$, and all available hog casings of similar sizes.

The quantities of these sizes of sheep and hog casings are limited, and are inadequate to supply the demand for the same, resulting in high prices for both. The larger hog casings on account of their large diameter cannot be used for the same purposes so that they do not command the high prices which are obtained for the small hog casings of approximate diameters from, say, $\frac{5}{8}''$ to $1\frac{1}{4}''$.

There are large quantities of the larger sizes of hog casings (which are wider than the above specified dimensions) produced all over the world for which the demand is limited. This condition has resulted in the wider hog casings invariably being sold at low prices compared with the prices obtained for the narrower hog casings. At the present time, the market value of the wide hog casings is about 50¢ per pound, whereas, on the narrow hog casings, the market is about $1.70 per pound.

Specifically, the chief object of this invention is to treat large and medium size hog casings and thereby reduce them in diameter to the dimension of sheep casings, so that they may be used in place of sheep casings in the manufacture of certain types of sausage. More generally, the object is to reduce the diameter of any animal casing so that it may be used for any purpose where a smaller casing is required.

The object of this invention is to provide a heat method of process by which casings may be shrunk in diameter so as to make them practically useful in the above described, and other trades.

The invention consists in a process or method attaining the above objects which is cheap, simple and easily practiced with satisfactory results. The invention further consists in the product and in many features and details which will be hereafter set forth in the specification and claims.

Broadly stated, the method consists in so treating the casing under such conditions that the casing is reduced in diameter without any return to original dimensions. In this specific embodiment of the invention, a casing or casings are subjected to heat, preferably while immersed in a liquid, usually but not necessarily water, for a sufficient length of time to shrink the casing to the required size. When the water bath is used, best results are obtained by having the water at a temperature of about 170° F. and keeping the casings in it for about sixty seconds. Satisfactory results may, however, be obtained from, say, 130° F. up, with consequent variations in the time. On completion of the treatment, the casing is removed and cooled either with or without a shower of water, whereupon—after running a stream of water through the casing to separate its opposite walls—the casing is packed for shipment or storage either in loose salt or brine.

While the results from proceeding only as above are reasonably satisfactory, better results are obtained by wrapping each casing, just as one would a string, spirally around a cylindrical member, such as a pipe or drum, and temporarily fastening the casing ends on the cylinder so that it will not become unwound from or slip on the cylindrical member. More than one casing may be put on the same cylinder.

The cylindrical member and its load of casings is first brought up to about 115° or 120° F. by immersion in water at about 120° and then immersed in a bath of 170° for sixty seconds.

After this, the cylinder is gradually cooled, as by immersing in cooler water, to a point where the casings can be conveniently manually removed from the cylinder: a stream of water is then as before passed through each casing, whereupon they are packed as before stated.

The use of the cylinder prevents any shrinkage in length of casing; it insures an even shrinkage in diameter of each casing, and prevents the casings acquiring undue elasticity.

Having thus described my invention, what I claim as new and desire to secure by Letters Patent is:

1. The method of producing an animal casing of desired size consisting of taking a larger casing, heat-treating it under conditions to reduce its diameter.

2. The method of producing an animal casing of desired size consisting of taking a larger casing, treating it with hot liquid under conditions to reduce its diameter.

3. The method of producing an animal casing of desired size, consisting in heating a casing to a temperature of approximately 170° F. for sixty seconds.

4. The herein described method of reducing the diameter of an animal casing which consists in immersing the casing in a liquid of about 170° F. temperature for about sixty seconds.

5. As an article of manufacture, an animal casing of given diameter produced by heating a casing of normally larger diameter.

6. The method of producing an animal casing of desired diameter which consists in winding a larger casing on a cylindrical member, immersing it in a hot bath, then removing the casing, passing liquid through it to separate its walls and then curing it.

7. The method of producing an animal casing of desired diameter which consists in winding a larger casing on a cylindrical member, immersing it in a hot bath of, say, 170° for say sixty seconds, then removing the casing, passing liquid through it to separate its walls, and then curing it.

8. The method of producing an animal casing of desired diameter which consists in winding a larger casing on a cylindrical member, tempering it at light heat of say 120°, immersing it in a hot bath, then removing the casing, passing liquid through it to separate its walls and then curing it.

9. The method of producing an animal casing of desired diameter which consists in winding a larger casing on a cylindrical member, tempering it at light heat of say 120°, immersing it in a hot bath of, say, 170° for say sixty seconds, then removing the casing, passing liquid through it to separate its walls, and then curing it.

10. The method of producing an animal casing of desired size consisting of taking a larger casing, heat-treating it under conditions to reduce its diameter, passing liquid through it to separate its walls, then curing it.

11. The method of producing an animal casing of desired size consisting of taking a larger casing, treating it with hot liquid under conditions to reduce its diameter, passing liquid through it to separate its walls, then curing it.

12. The method of producing an animal casing of desired size, consisting in heating a casing to a temperature of approximately 170° F. for sixty seconds, passing liquid through it to separate its walls, then curing it.

13. The herein described method of reducing the diameter of an animal casing which consists in immersing the casing in a liquid of about 170° F. temperature for about sixty seconds, passing liquid through it to separate its walls, then curing it.

In witness whereof, I have hereunto subscribed my name.

EDWIN G. JAMES.